(12) United States Patent
Chen et al.

(10) Patent No.: US 7,249,205 B2
(45) Date of Patent: *Jul. 24, 2007

(54) APPARATUS AND METHOD TO PROVIDE INFORMATION FROM A FIRST INFORMATION STORAGE AND RETRIEVAL SYSTEM TO A SECOND INFORMATION STORAGE AND RETRIEVAL SYSTEM

(75) Inventors: Alex Chen, Tucson, AZ (US); James Chen, Tucson, AZ (US); Olympia Gluck, Haifa (IL); Theodore T. Harris, Jr., Tucson, AZ (US); Minh-Ngoc Huynh, San Jose, CA (US); Gabriel G. Walder, Haim (IL)

(73) Assignee: International Business Machines Corporation, Armonk, NY (US)

(*) Notice: Subject to any disclaimer, the term of this patent is extended or adjusted under 35 U.S.C. 154(b) by 440 days.

This patent is subject to a terminal disclaimer.

(21) Appl. No.: 10/719,484

(22) Filed: Nov. 20, 2003

(65) Prior Publication Data

US 2005/0114573 A1    May 26, 2005

(51) Int. Cl.
*G06F 3/00* (2006.01)
*G06F 11/00* (2006.01)
*G06F 15/173* (2006.01)

(52) U.S. Cl. .................. 710/38; 714/43; 709/224

(58) Field of Classification Search ............ None
See application file for complete search history.

(56) References Cited

U.S. PATENT DOCUMENTS 5,970,030 A   10/1999  Dimitri et al.
6,269,423 B1   7/2001  Kishi
6,937,611 B1 *  8/2005  Ward ................. 370/462
6,996,629 B1 *  2/2006  Odenwald ............. 709/238
2001/0025308 A1 *  9/2001  Jinushi et al. ........ 709/219
2002/0062375 A1   5/2002  Tedosiu et al.
2003/0088638 A1   5/2003  Gluck et al.
2003/0188229 A1  10/2003  Lubbers et al.
2004/0103210 A1 *  5/2004  Fujii et al. .......... 709/239
2005/0063334 A1 *  3/2005  Fnu et al. ........... 370/329
2005/0080895 A1 *  4/2005  Cook et al. .......... 709/224

FOREIGN PATENT DOCUMENTS

EP     0 739 110       10/1996

* cited by examiner

*Primary Examiner*—Donald Sparks
*Assistant Examiner*—David Martinez
(74) *Attorney, Agent, or Firm*—Chandler & Udall, LLP; Dale F. Regelman

(57) ABSTRACT

A method to provide information from a first information storage and retrieval system to a second information storage and retrieval system. Applicants' method provides a first information storage and retrieval system, where that first information storage and retrieval system comprises (N) PPRC adapters and information, and provides a second information storage and retrieval system. The method generates and saves an Established Path Bitmap which recites each of the (N) PPRC adapters, and generates an Available Path Bitmap. If a PPRC adapter is in communication with the secondary information storage and retrieval system, then the method adds that adapter to the Available Path Bitmap. The Established Path Bitmap and the Available Path Bitmap are used for subsequent PPRC operations.

15 Claims, 6 Drawing Sheets

APPARATUS AND METHOD TO PROVIDE INFORMATION FROM A FIRST INFORMATION STORAGE AND RETRIEVAL SYSTEM TO A SECOND INFORMATION STORAGE AND RETRIEVAL SYSTEM

FIELD OF THE INVENTION

The invention relates to an apparatus and method to provide information from a first information storage and retrieval system to a second information storage and retrieval system. In certain embodiments, the invention relates to an apparatus and method to provide information from a primary information storage and retrieval system to a secondary information storage and retrieval system using a peer-to-peer remote copy operation.

BACKGROUND OF THE INVENTION

In hierarchical computer storage systems, fast and intensively used storage are paired with arrays of slower and less frequently accessed data devices. One example of high-speed, expensive memory is a direct access storage device file buffer (DASD). Slower storage devices include tape drives and disk drive arrays, which are less expensive than a DASD.

Data disaster recovery solutions include various "peer-to-peer" copy routines where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers.

In order to assure data consistency at both the primary information storage and retrieval system and the secondary information storage and retrieval system, particularly when using an asynchronous PPRC copy methods, it is desirable to communicate information expeditiously from the primary storage system to the secondary system.

What is needed is a method to catalog and test communication pathways between a primary information storage and retrieval system and a secondary, i.e. remote, information storage and retrieval system. Applicants' method provides such a method to catalog established communication paths between the primary and secondary systems, and to determine the availability of those communication paths to communicate information from the primary storage system to the secondary storage system.

SUMMARY OF THE INVENTION

Applicants' invention includes an apparatus and method to provide information from a first information storage and retrieval system to a second information storage and retrieval system. Applicants' method provides a first information storage and retrieval system, where that first information storage and retrieval system comprises (N) PPRC adapters and information, and provides a second information storage and retrieval system, where that second information storage and retrieval system is capable of receiving said information from the first information storage and retrieval system via the one or more of the (N) PPRC adapters.

The method generates and saves an Established Path Bitmap, where that Established Path Bitmap recites the (N) PPRC adapters. The method also generates an Available Path Bitmap. The method then determines, for each of the (N) PPRC adapters, if that PPRC adapter is in communication with the secondary information storage and retrieval system.

If a PPRC adapter is in communication with the secondary information storage and retrieval system, then the method adds that adapter to the Available Path Bitmap. After testing all PPRC adapters recited on the Established Path Bitmap, and adding those adapters in communication with the secondary information storage and retrieval system in the Available Path Bitmap, the method saves the Available Path Bitmap. The Established Path Bitmap and the Available Path Bitmap are used for subsequent PPRC operations.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in a data processing system. The following description of Applicants' method to provide information from a first information storage and retrieval system to a second information storage and retrieval system is not meant, however, to limit Applicants' invention to use in a data processing system, as the invention herein can be applied to transmission of information between computer systems in general.

Figure 2:
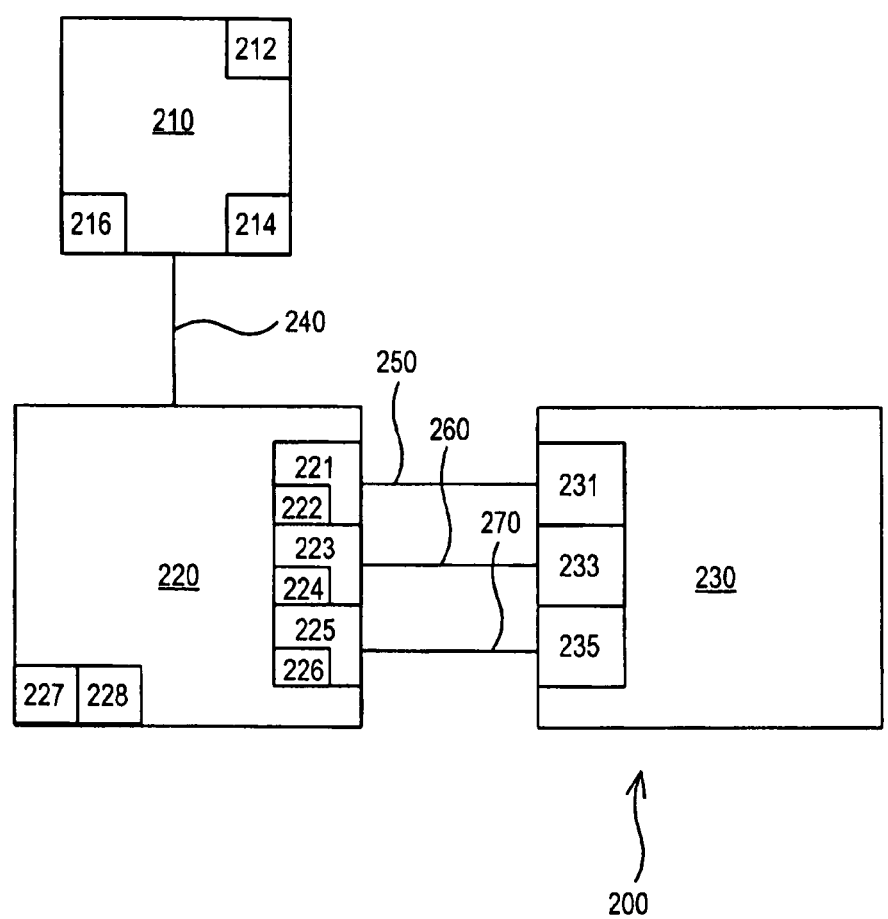
FIG. 2 is a block diagram showing a host computer, a primary data storage and retrieval system, and a secondary data storage and retrieval system.

FIG. 2 shows one embodiment of Applicants' data processing system 200. Referring now to FIG. 2, system 290 includes host computer 210, primary information storage and retrieval system 220, and secondary information storage and retrieval system 230.

Host computer 210 comprises a computer system, such as a mainframe, personal computer, workstation, and combinations thereof, including an operating system 212 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 210 includes a storage management program 214. The storage management program 214 in the host computer 210 may include the functionality of storage management type programs known in the art that manage the transfer of data to a data storage and retrieval system, such as the IBM DFSMS implemented in the IBM MVS operating system.

Storage management program 214 may include known storage management program functions, such as recall and migration. The storage management program 214 may be implemented within the operating system 212 of the host computer 210 or as a separate, installed application program 216: Alternatively, storage management program 214 may include device drivers, backup software, application programs 126, and the like.

The illustrated embodiment of FIG. 2 includes a single host computer. In other embodiments, Applicants' data processing system includes two or more host computers, where those two or more host computers are capable of communicating with primary information storage and retrieval system 220.

Host computer 210 is capable of communicating with primary information storage and retrieval system 220 via communication link 240. In certain embodiments, communication link 240 is selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

Primary information storage and retrieval system 220 includes controller 227. Primary information storage and retrieval system 220 further includes non-volatile storage 228.

In the illustrated embodiment of FIG. 2, primary information storage and retrieval system 220 is capable of communicating with secondary information storage and retrieval system 230 via one or more of communication links 250, 260, and 270. In certain embodiments, communication links 250, 260, and 270, are each independently selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2, primary information storage and retrieval system 220 is capable of providing information to secondary information storage and retrieval system 230 via a first communication path which includes PPRC adapter 221, communication link 250, and PPRC adapter 231. PPRC adapter 221 includes microcode 222.

Primary information storage and retrieval system 220 is capable of providing information to secondary information storage and retrieval system 230 via a second communication path which includes PPRC adapter 223, communication link 260, and PPRC adapter 233. PPRC adapter 223 includes microcode 224.

Primary information storage and retrieval system 220 is capable of providing information to secondary information storage and retrieval system 230 via a third communication path which includes PPRC adapter 225, communication link 270, and PPRC adapter 235. PPRC adapter 225 includes microcode 226.

As those skilled in the art will appreciate, PPRC adapters 221, 223, and/or 225, are sometimes referred to as "ports." As used herein, the terms PPRC adapter and PPRC port are interchangeable.

The illustrated embodiment of FIG. 2 shows a 1:1 correlation of primary adapters, i.e. PPRC adapters disposed in the primary system 220, and secondary adapters, i.e. PPRC adapters disposed in the secondary system 230. In other embodiments, Applicants' system 200 includes (N1) PPRC adapters disposed in the primary system and (N2) PPRC adapters disposed in the secondary system, where (N1) does not equal (N2). In certain embodiments, (N1) is greater than (N2). In other embodiments, (N1) is less than (N2). In either embodiment, one or more switches disposed in either the primary system and in communication with the (N1) PPRC adapters disposed in that primary system, and/or one or more switches disposed in the secondary system and in communication with the (N2) PPRC adapters disposed in the secondary system, are set such that the (N1) primary PPRC adapters can communicate with the (N2) secondary PPRC adapters, even where (N1) does not equal (N2).

In certain embodiments, Applicants' primary information storage and retrieval system comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, Applicants' primary information storage and retrieval system comprises a virtual tape system. U.S. Pat. No. 6,269,423, assigned to the common assignee herein, describes such a virtual tape system, and is hereby incorporated by reference. In certain embodiments, Applicants' primary information storage and retrieval system comprises information storage and retrieval system 100 (FIG. 1).

In certain embodiments, Applicants' secondary information storage and retrieval system comprises an automated media library comprising a plurality of tape cartridges, one or more robotic accessors, and one or more tape drives. In certain embodiments, Applicants' primary information storage and retrieval system comprises a virtual tape system. In certain embodiments, Applicants' secondary information storage and retrieval system comprises information storage and retrieval system 100 (FIG. 1).

Figure 1:
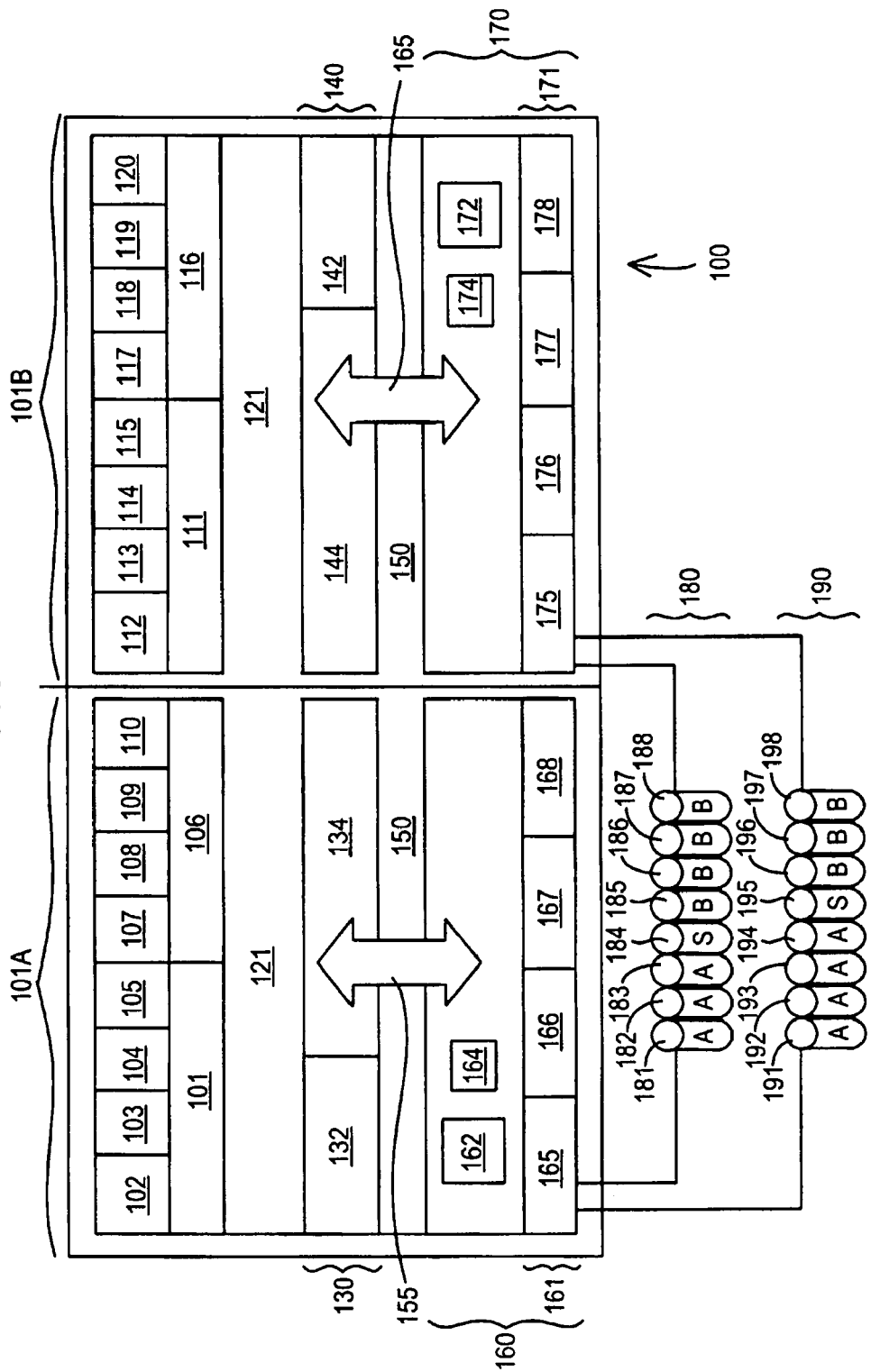
FIG. 1 is a block diagram showing the components of Applicants' data storage and retrieval system.

Referring now to FIG. 1, Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. Processor portion 140 includes processor 142 and cache 144. I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two disk arrays, namely array "A" and array "B". In certain embodiments, hard disk arrays "A" and "B" utilize a RAID protocol. As those skilled in the art will appreciate, a RAID (Redundant Array of Independent Disks) rank combines multiple inexpensive disk drives into an array of disk drives to obtain performance, capacity and reliability that exceeds that of a single large drive.

In certain embodiments, arrays "A" and "B" comprise what is sometimes called a JBOD array, i.e. "Just a Bunch Of Disks" where the array is not configured according to RAID. The illustrated embodiment of FIG. 1 shows two hard disk arrays. In other embodiments, Applicants' information storage and retrieval system includes more than two hard disk arrays.

Hard disk array "A" includes disk drives 181, 182, 183, 184, 191, 192, and 193. Hard disk array "B" includes disk drives 185, 186, 187, 188, 195, 196, 197, and 198. In the illustrated embodiment of FIG. 1, each loop includes at least two spare disks, namely disks 184 and 195. Each of the hard disk arrays includes one of those spare disks.

Figure 3:
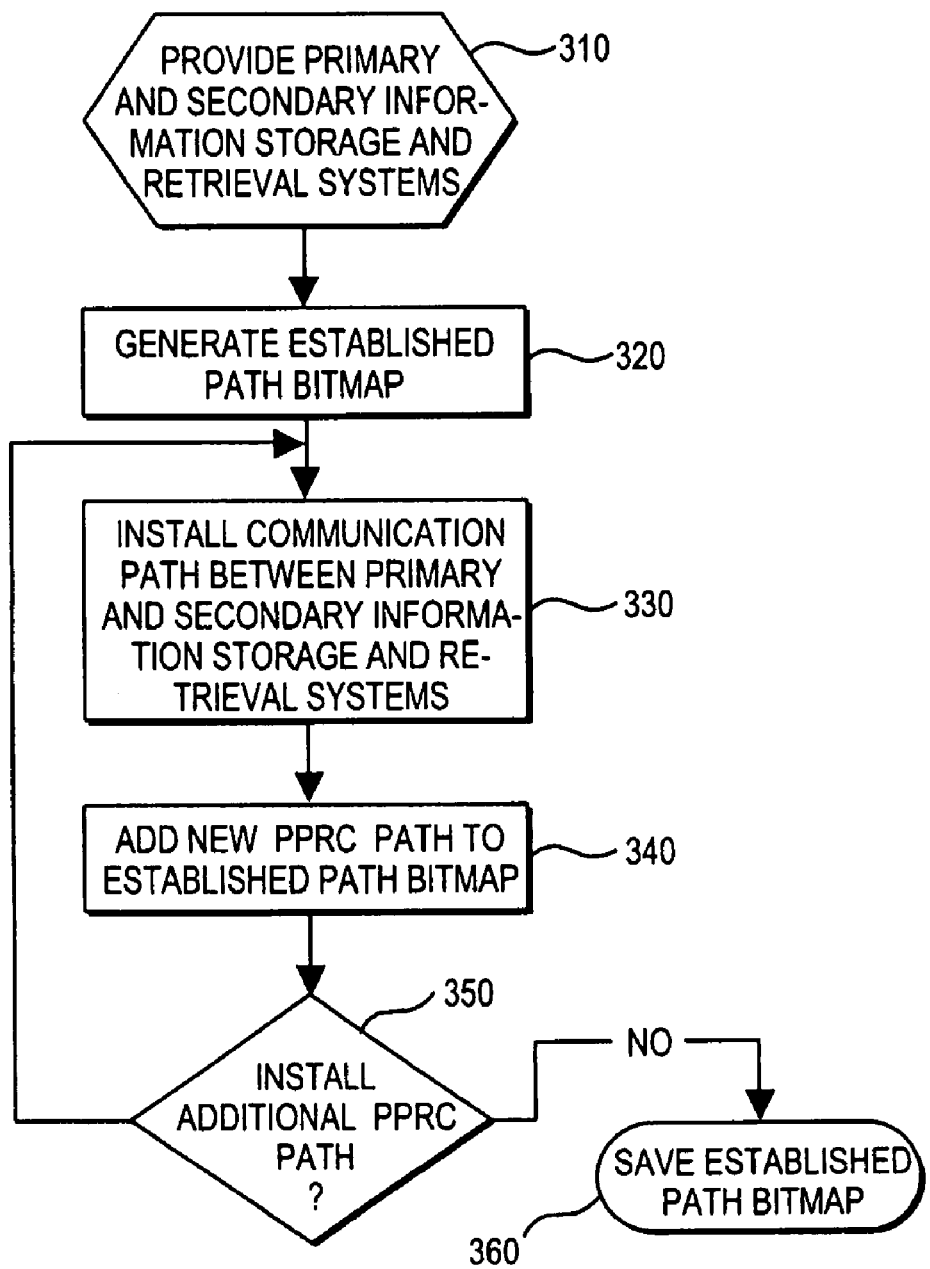
FIG. 3 is a flow chart summarizing the initial steps of Applicants' method.

Applicants' invention includes a method to provide information from a primary information storage and retrieval system to a secondary information storage and retrieval system, such as secondary system 230. FIG. 3 summarizes certain initial steps in Applicants' method.

Referring now to FIG. 3, in step 310 Applicants' method provides a primary information storage and retrieval system, such as primary system 220 (FIG. 2). In step 320, Applicant's method generates an Established Path Bitmap. In certain embodiments, step 320 is performed by a system user via an operator input panel. In certain embodiments, step 320 is performed by a host computer in communication with the primary information storage and retrieval system.

In step 330, Applicant's method installs a communication path, such as the communication path which includes adapter 221 (FIG. 2), communication link 250 (FIG. 2), and adapter 231 (FIG. 2), between a primary information storage and retrieval system, such as primary system 220 (FIG. 2), and a secondary information storage and retrieval system, such as system 230 (FIG. 2). In certain embodiments, step 330 is performed by a system user.

In step 340, Applicants' method adds the communication path installed in step 330 to the Established Path Bitmap created in step 320. In certain embodiments, step 340 is performed by a system user. In step 350, Applicants' method determines if additional PPRC communication paths are to be installed between the primary system and the secondary system. In certain embodiments, step 350 is performed by a system user.

If Applicants' method determines in step 350 that additional PPRC paths are to be installed, then Applicants' method transitions from step 350 to step 330 and continues. Alternatively, if Applicants' method determines in step that no additional PPRC paths remain to be installed at the present time, then Applicants' method transitions from step 350 to step 360 wherein the method saves the Established Path Bitmap.

In certain embodiments of Applicants' method, one or more PPRC adapters may be later installed in, or later removed from, the primary information storage and retrieval system. In these embodiments, each newly added PPRC adapter is added to the Established Path Bitmap, and each newly removed PPRC adapter is deleted from the Established Path Bitmap.

Figure 4:
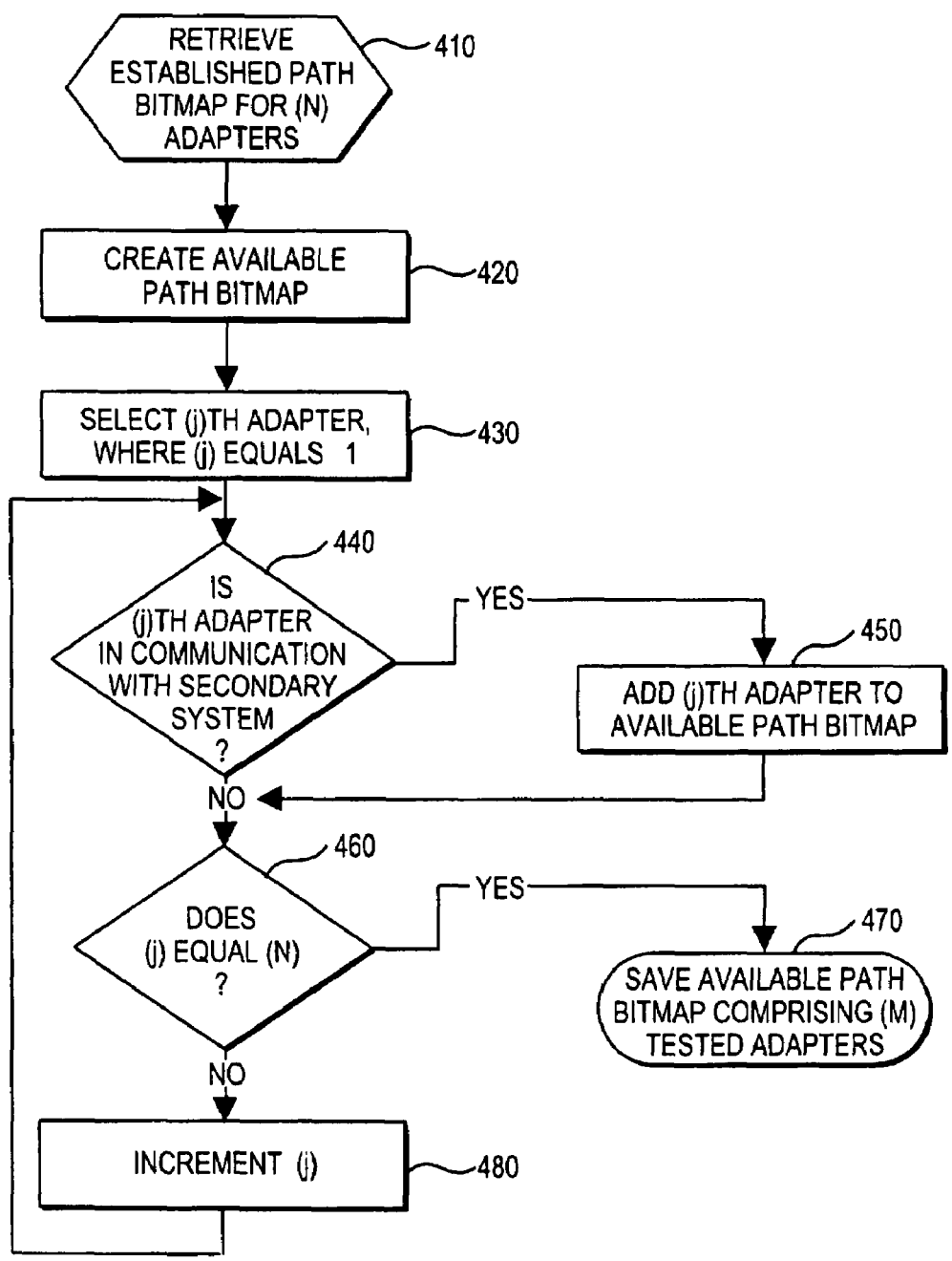
FIG. 4 is a flow chart summarizing certain additional steps of Applicants' method.

FIG. 4 summarizes additional steps in Applicants' method, wherein those steps use the Established Path Bitmap saved in step 360 (FIG. 3). Referring now to FIG. 4, in step 410 Applicants' method retrieves the Established Path Bitmap saved in step 360, where that Established Path Bitmap includes information regarding (N) PPRC adapters disposed in that primary system. In certain embodiments, step 410 is performed by a controller, such as controller 227 (FIG. 2) disposed in a primary information storage and retrieval system, such as primary system 220 (FIG. 2).

In step 420, Applicants' method creates an Available Path Bitmap. In certain embodiments, step 420 is performed by a system user. In certain embodiments, step 420 is performed by a controller disposed in the primary information storage and retrieval system, such as controller 227 (FIG. 2).

In step 430, Applicants' method selects one of the PPRC adapters from the Established Path Bitmap, i.e. the (j)th adapter where (j) is initially set to 1. In certain embodiments, step 430 is performed by a controller, such as controller 227 disposed in a primary information storage and retrieval system, such as primary system 220.

Applicants' method transitions from step 430 to step 440 wherein Applicants' method determines if the adapter selected in step 430 is in communication with the secondary information storage and retrieval system, i.e. determines if the selected PPRC communication path is operational. In certain embodiments, step 440 is performed by a controller, such as controller 227 disposed in a primary information storage and retrieval system, such as primary system 220. In certain embodiments, step 440 is performed by the selected PPRC adapter, such as adapter 221 (FIG. 2). In certain embodiments, step 440 is performed using microcode, such as microcode 222 (FIG. 2), disposed in the selected adapter.

If Applicants' method determines in step 440 that the adapter selected in step 430 is in communication with the secondary information storage and retrieval system, then the method transitions from step 440 to step 450 wherein the method adds the selected adapter to the Available Path Bitmap created in step 420. Applicants' method transitions from step 450 to step 460.

If Applicants' method determines in step 440 that the adapter selected in step 430 is not in communication with the secondary information storage and retrieval system, then the method transitions from step 440 to step 460 wherein the method determines if all of the (N) adapters have been tested, i.e. if (j) equals (N). In certain embodiments, step 460 is performed by a controller disposed in the primary information storage and retrieval system. In certain embodiments, step 460 is performed by a host computer.

If Applicants' method determines in step 460 that all (N) adapters recited in the Established Path Bitmap have been tested, then Applicants' method transitions from step 460 to step 470 wherein the method saves the Available Path Bitmap. In certain embodiments, step 470 is performed by a controller disposed in the primary information storage and retrieval system. In certain embodiments, step 470 is performed by a host computer.

Alternatively, if Applicants' method determines in step 460 that all (N) adapters recited in the Established Path Bitmap have not been tested, then Applicants' method transitions from step 460 to step 480 wherein the method increments (j). In certain embodiments, step 480 is performed by a controller disposed in the primary information storage and retrieval system. In certain embodiments, step 480 is performed by a host computer. Applicants' method transitions from step 480 to step 440 and continues.

Figure 5:
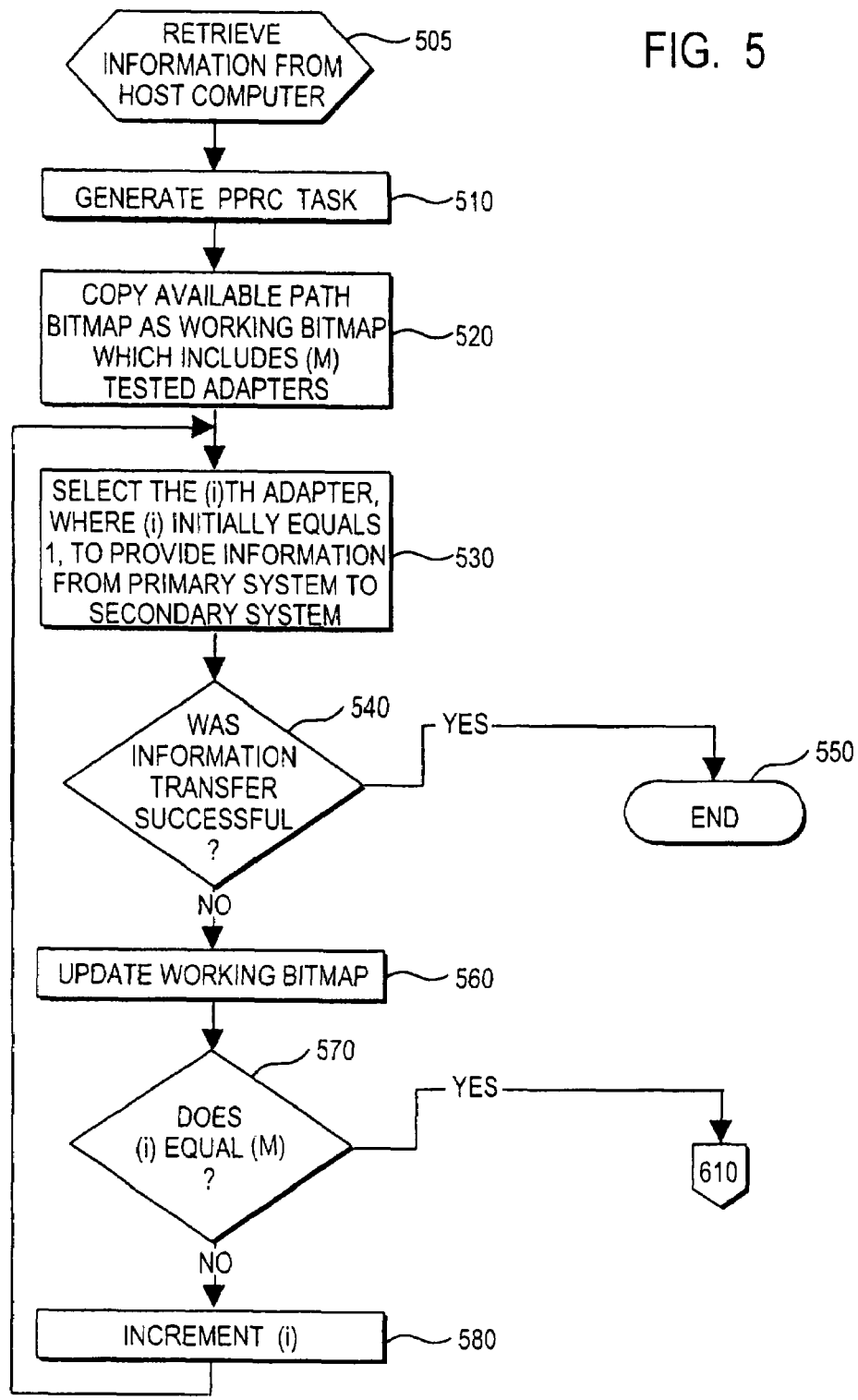
FIG. 5 is a flow chart summarizing certain additional steps of Applicants' method.

FIG. 5 summarizes certain additional steps in Applicants' method to provide information from a primary information storage and retrieval system, such as primary system 220 (FIG. 2) to a secondary information storage and retrieval system, such as secondary system 230 (FIG. 2), using the Available Path Bitmap saved in step 470 (FIG. 4) and/or the Established Path Bitmap saved in step 360 (FIG. 3).

Referring now to FIG. 5, in step 505 the primary information storage and retrieval system, such as primary system 220 (FIG. 2) receives a new or updated file from one or more host computers, such as host computer 210 (FIG. 2). In certain embodiments, the file of step 510 is provided by an application, such as application 216, running on the host computer. Applicants' method transitions from step 505 to step 510 wherein Applicants' primary information storage and retrieval system, such as system 220, generates a peer-to-peer remote ("PPRC") copy operation, wherein the PPRC operation includes providing the file of step 505 to a secondary information storage and retrieval system, such as system 230. In certain embodiments, step 510 is performed by a controller disposed in the primary information storage and retrieval system.

Applicants' method transitions from step 510 to step 520 wherein the method copies the Available Path Bitmap saved in step 470 (FIG. 4) as a Working Bitmap, where that Working Bitmap recites (M) tested adapters. As those skilled in the art will appreciate, the number of tested adapters, i.e. (M), is less than or equal to (N), i.e. the total number of PPRC adapters disposed in the primary information storage and retrieval system. In certain embodiments, step 520 is performed by a controller disposed in the primary information storage and retrieval system.

Applicants' method transitions from step 520 to step 530 wherein the method selects one of the (M) tested adapters to provide information from the primary information storage and retrieval system to the secondary information storage and retrieval system. In certain embodiments, step 530 is performed by a controller disposed in the primary information storage and retrieval system. In certain embodiments, step 530 is performed by a host computer.

Applicants' method transitions from step 530 to step 540 wherein the method determines if the information was successfully transferred from the primary system to the secondary system using the adapter selected in step 530. In certain embodiments, step 540 is performed by a controller disposed in the primary information storage and retrieval system. In certain embodiments, step 540 is performed by a host computer. In certain embodiments, step 540 is performed by the selected adapter using microcode disposed therein.

If Applicants' method determines in step 540 that the information was successfully transferred from the primary system to the secondary system using the adapter selected in step 530, then the method transitions from step 540 to step 550 and ends. Alternatively, if Applicants' method determines in step 540 that the information was not successfully transferred from the primary system to the secondary system using the adapter selected in step 530, then the method transitions from step 540 to step 560 wherein the method updates the Working Bitmap to indicate that the (i)th adapter is not in communication with the secondary system.

Applicants' method transitions from step 560 to step 570 wherein the method determines if all the adapters recited in the Working Bitmap of step 520 have been unsuccessfully used to provide information from the primary system to the secondary system, i.e. if (i) equals (M). In certain embodiments, step 570 is performed by a controller disposed in the primary information storage and retrieval system. In certain embodiments, step 570 is performed by a host computer.

If Applicants' method determines in step 570 that all the adapters recited in the Working Bitmap of step 520 have not been unsuccessfully used to provide information from the primary system to the secondary system, then Applicants' method transitions from step 570 to step 580 wherein the method increments (i). In certain embodiments, step 580 is performed by a controller disposed in the primary information storage and retrieval system. In certain embodiments, step 580 is performed by a host computer. Applicants' method transitions from step 580 to step 530 and continues.

Figure 6:
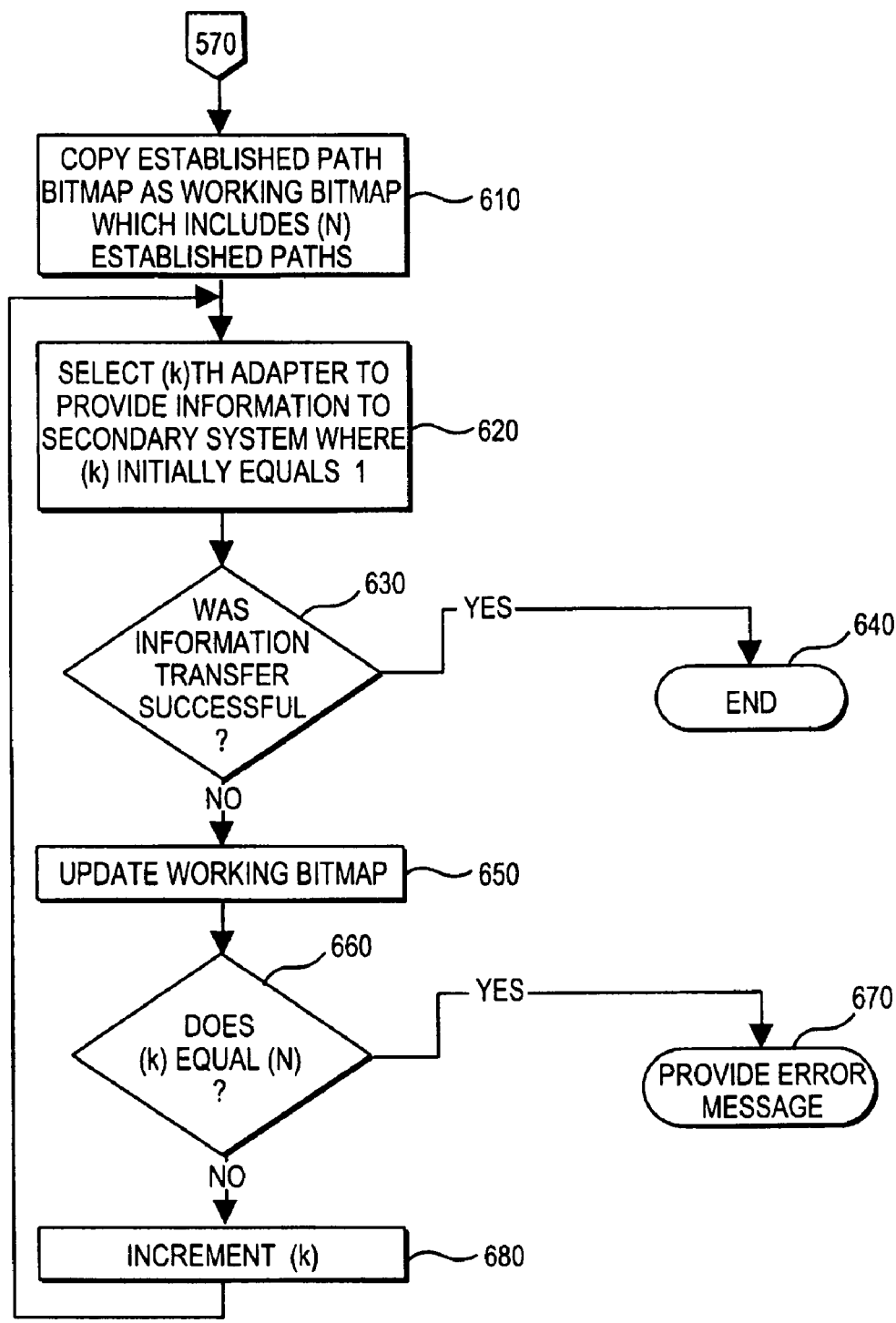
FIG. 6 is a flow chart summarizing certain additional steps of Applicants' method.

If Applicants' method determines in step 570 that all the adapters recited in the Working Bitmap of step 520 have been unsuccessfully used to provide information from the primary system to the secondary system, then Applicants' method transitions from step 570 to step 610 (FIG. 6).

Referring now to FIG. 6, in step 610 Applicants' method copies the Established Path Bitmap saved in step 360 (FIG. 3) as the Working Bitmap, where that Established Path Bitmap recites (N) adapters. In certain embodiments, step 610 is performed by a controller disposed in the primary information storage and retrieval system. In certain embodiments, step 610 is performed by a host computer.

Applicants' method transitions from step 610 to step 620 wherein the method selects a first one of the (N) adapters to provide information from the primary information storage and retrieval system to the secondary information storage and retrieval system. In certain embodiments, step 620 is performed by a controller disposed in the primary information storage and retrieval system. In certain embodiments, step 620 is performed by a host computer.

Applicants' method transitions from step 620 to step 630 wherein the method determines if the information was successfully transferred from the primary system to the secondary system using the adapter selected in step 620. In certain embodiments, step 630 is performed by a controller disposed in the primary information storage and retrieval system. In certain embodiments, step 630 is performed by a host computer. In certain embodiments, step 630 is performed by the selected adapter using microcode disposed therein.

If Applicants' method determines in step 630 that the information was successfully transferred from the primary system to the secondary system using the adapter selected in step 620, then the method transitions from step 630 to step 640 and ends. Alternatively, if Applicants' method determines in step 630 that the information was not successfully transferred from the primary system to the secondary system using the adapter selected in step 620, then the method transitions from step 630 to step 650 wherein the method updates the Working Bitmap to indicate that the adapter selected in step 620 is not in communication with the secondary information storage and retrieval system. In certain embodiments, step 650 is performed by a controller disposed in the primary information storage and retrieval system. In certain embodiments, step 670 is performed by a host computer.

Applicants' method transitions from step 650 to step 660 wherein the method determines if all the adapters recited in the Working Bitmap of step 610 have been unsuccessfully used to provide information from the primary system to the secondary system, i.e. if (k) equals (N). In certain embodiments, step 660 is performed by a controller disposed in the primary information storage and retrieval system. In certain embodiments, step 680 is performed by a host computer.

If Applicants' method determines in step 660 that all the adapters recited in the Working Bitmap of step 616 have not been unsuccessfully used to provide information from the primary system to the secondary system, then Applicants' method transitions from step 660 to step 680 wherein the method increments k). In certain embodiments, step 680 is performed by a controller disposed in the primary information storage and retrieval system. In certain embodiments, step 680 is performed by a host computer. Applicants' method transitions from step 680 to step 620 and continues.

If Applicants' method determines in step 660 that all the adapters recited in the Working Bitmap of step 610 have been unsuccessfully used to provide information from the primary system to the secondary system, then Applicants' method transitions from step 660 to step 670 wherein the method provides an error message. In certain embodiments, step 670 is performed by a controller disposed in the primary information storage and retrieval system.

The embodiments of Applicants' method recited in FIGS. 3, 4, 5, and/or 6, may be implemented separately. Moreover, in certain embodiments, individual steps recited in FIGS. 3, 4, 5 and/or 6, may be combined, eliminated, or reordered.

In certain embodiments, Applicants' invention includes instructions residing in non-volatile memory 228 (FIG. 2), where those instructions are executed by controller 227 (FIG. 2) to performs steps 320 and 360 recited in FIG. 3, steps 410 through 480 recited in FIG. 4, steps 505 through 580 recited in FIG. 5, and steps 610 through 680 recited in FIG. 6. In other embodiments, Applicants' invention includes instructions residing in any other computer program product, where those instructions are executed by a computer external to, or internal to, system 200, to perform steps 320 and 360 recited in FIG. 3, steps 410 through 480 recited in FIG. 4, steps 505 through 580 recited in FIG. 5, and steps 610 through 680 recited in FIG. 6. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide information from a first information storage and retrieval system to a second information storage and retrieval system, comprising the steps of:
   providing said first information storage and retrieval system, wherein said first information storage and retrieval system comprises (N) PPRC adapters, a plurality of host adapters, at least one host computer interconnected with at least one of said plurality of host adapters, a cache, a plurality of device adapters, a plurality of disk drives interconnected with said plurality of device adapters, and information;
   providing said second information storage and retrieval system, wherein said second information storage and retrieval system is capable of receiving said information from said first information storage and retrieval system via one or more of said (N) PPRC adapters;
   ascertaining, for each value of (j), if the (j)th PPRC adapter is in communication with said second information storage and retrieval system, wherein (j) is greater than or equal to 1 and less than or equal to (N);
   operative if the (j)th PPRC adapter is in communication with said second information storage and retrieval system, including said (j)th PPRC adapter as one of (M) tested adapters, wherein (M) is less than or equal to (N);
   generating a PPRC task comprising a flag, wherein said flag is set to "off";
   selecting the (i)th tested adapter, wherein (i) is greater than or equal to 1 and less than or equal to (M), and wherein (i) is initially set to 1;
   providing said information to said second information storage and retrieval system using said (i)th tested adapter;
   determining if said information was received by said second information storage and retrieval system using said (i)th tested adapter;
   operative if said information was not received by said second information storage and retrieval system using said (i)th tested adapter, establishing if (i) equals (M);
   operative if (i) does not equal (M):
   incrementing (i);
   repeating said selecting step, said providing step, said determining step, and said incrementing step.

2. The method of claim 1, wherein said first information storage and retrieval system is capable of communication with one or more host computers, further comprising the steps of:
   receiving said information by said first storage and retrieval system information from said one or more host computers; and
   generating a PPRC request comprising providing said information to said second information storage and retrieval system.

3. The method of claim 2, further comprising the steps of:
   operative if said information was not provided to said second information storage and retrieval system using any of said (M) tested adapters setting said flag to "on" and choosing the (k)th PPRC adapter, wherein (k) is greater than or equal to 1 and less than or equal to (N), and wherein (k) is initially set to 1;
   sending said information to said second information storage and retrieval system using said (k)th PPRC adapter.

4. The method of claim 3, further comprising the steps of:
   verifying that said information was received by said second information storage and retrieval system using said (k)th PPRC adapter;
   operative if said information was not received by said second information storage and retrieval system using said (k)th PPRC adapter:
   comparing (k) with (N);
   operative if (k) does not equal (N):
   increasing (k) by 1;
   repeating said choosing step, said sending step, said verifying step, and said increasing step.

5. The method of claim 4, further comprising the steps of:
operative if said information was not received by said second information storage and retrieval system by sending said information using said (k)th PPRC adapter, and if (k) equals (N), providing an error message.

6. An article of manufacture comprising a computer readable-medium having computer readable program code disposed therein to provide information from a first information storage and retrieval system to a second information storage and retrieval system, wherein said first information storage and retrieval system comprises (N) PPRC adapters, a plurality of host adapters, at least one host computer interconnected with at least one of said plurality of host adapters, a cache, a plurality of device adapters, a plurality of disk drives interconnected with said plurality of device adapters, and information, and wherein said second information storage and retrieval system is capable of receiving said information from said first information storage and retrieval system via one or more of said (N) PPRC adapters, the computer readable program code comprising a series of computer readable program steps to effect:
ascertaining, for each value of (j), if the (j)th PPRC adapter is in communication with said second information storage and retrieval system, wherein (j) is greater than or equal to 1 and less than or equal to (N);
operative if the (j)th PPRC adapter is in communication with said second information storage and retrievaL system, including said (j)th PPRC adapter as one of (M) tested adapters, wherein (M) is less than or equal to (N);
generating a PPRC task comprising a flag, wherein said flag is set to "off";
selecting the (i)th tested adapter, wherein (i) is greater than or equal to 1 and less than or equal to (M), and wherein (i) is initially set to 1;
providing said information to said second information storage and retrieval system using said (i)th tested adapter;
determining if said information was received by said second information storage and retrieval system using said (i)th tested adapter;
operative if said information was not received by said second information storage and retrieval system using said (i)th tested adapter, establishing if (i) equals (M);
operative if (i) does not equal (M):
incrementing (i);
repeating said selecting step, said providing step, said determining step, and said incrementing step.

7. The article of manufacture of claim 6, wherein said article of manufacture is capable of communication with one or more host computers, said computer readable program code further comprising a series of computer readable program steps to effect:
receiving said information by said article of manufacture from said one or more host computers; and
generating a PPRC request comprising providing said information to said second information storage and retrieval system.

8. The article of manufacture of claim 7, said computer readable program code further comprising a series of computer readable program steps to effect:
operative if said information was not received by said second information storage and retrieval system using any of said (M) tested adapters, setting said flag to "on" and choosing the (k)th PPRC adapter, wherein (k) is greater than or equal to 1 and less than or equal to (N), and wherein (k) is initially set to 1;
sending said information to said second information storage and retrieval system using said (k)th PPRC adapter.

9. The article of manufacture of claim 8, said computer readable program code further comprising a series of computer readable program steps to effect:
verifying that said information was received by said second information storage and retrieval system using said (k)th PPRC adapter;
operative if said information was not received by said second information storage and retrieval system using said (k)th PPRC adapter:
comparing (k) with (N);
operative if (k) does not equal (N):
increasing (k) by 1;
repeating said choosing step, said sending step, said verifying step, and said increasing step.

10. The article of manufacture of claim 9, said computer readable program code further comprising a series of computer readable program steps to effect providing an error message if said information was not received by said second information storage and retrieval system by sending said information using said (k)th PPRC adapter, and if (k) equals (N), providing an error message.

11. A computer program product encoded in an information storage medium, said computer program product being usable with a programmable computer processor to provide information from a first information storage and retrieval system to a second information storage and retrieval system, wherein said first information storage and retrieval system comprises (N) PPRC adapters, a plurality of host adapters, at least one host computer interconnected with at least one of said plurality of host adapters, a cache, a plurality of device adapters, a plurality of disk drives interconnected with said plurality of device adapters, and information, and wherein said second information storage and retrieval system is capable of receiving said information from said first information storage and retrieval system via one or more of said (N) PPRC adapters, comprising:
computer readable program code which causes said programmable computer processor to ascertain, for each value of (j), if the (j)th PPRC adapter is in communication with said second information storage and retrieval system, wherein (j) is greater than or equal to 1 and less than or equal to (N);
computer readable program code which, if the (j)th PPRC adapter is in communication with said second information storage and retrieval system, causes said programmable computer processor to include said (j)th PPRC adapter as one of (M) tested adapters, wherein (M) is less than or equal to (N);
computer readable program code which causes said programmable computer processor to generate a PPRC task comprising a flag, wherein said flag is set to "off";
computer readable program code which causes said programmable computer processor to select the (i)th tested adapter, wherein (i) is greater than or equal to 1 and less than or equal to (M), and wherein (i) is initially set to 1;
computer readable program code which causes said programmable computer processor to provide information to said second information storage and retrieval system using said (i)th tested adapter;
computer readable program code which causes said programmable computer processor to determine if said information was received by said second information storage and retrieval system using said (i)th tested adapter;
computer readable program code which, if said information was not received by said second information storage and retrieval system using said (i)th tested adapter, causes said programmable computer processor to sequentially increment (i) and provide said information to said second information storage and retrieval system using, for each incremental value of (i), the (i)th tested adapter until said information is received by said second information storage and retrieval system or until (i) equals (M).

12. The computer program product of claim 11, wherein said first information storage and retrieval system is capable of communicating with a host computer, further comprising:
   computer readable program code which causes said programmable computer processor to receive by said first information storage and retrieval system said information from said one or more host computers; and
   computer readable program code which causes said programmable computer processor to generate a PPRC request comprising providing said information to said second information storage and retrieval system.

13. The computer program product of claim 12 further comprising:
   operative if said information was not received by said second information storage and retrieval system using any of said (M) tested adapters, computer readable program code which causes said programmable computer processor to said flag to "on" and choose the (k)th PPRC adapter, wherein (k) is greater than or equal to 1 and less than or equal to (N), and wherein (k) is initially set to 1;
   computer readable program code which causes said programmable computer processor to send said information to said second information storage and retrieval system using said (k)th PPRC adapter.

14. The computer program product of claim 13, further comprising:
   computer readable program code which causes said programmable computer processor to verify that said information was received by said second information storage and retrieval system using said (k)th PPRC adapter;
   computer readable program code which, if said information was not received by said second information storage and retrieval system using said (k)th PPRC adapter, causes said programmable computer processor to sequentially increment (k) and send said information to said second information storage and retrieval system using, for each incremental value of (k), the (k)th PPRC adapter until said information is received by said second information storage and retrieval system or until (k) equals (N).

15. The computer program product of claim 14, further comprising computer readable program code which, if said information was not received by said second information storage and retrieval system after sending said information using each of said (N) PPRC adapters, causes said programmable computer processor to provide an error message.

* * * * *